Sept. 1, 1953 J. F. REHEISER 2,650,642
METHOD OF PREVENTING BLOWS IN MANUFACTURE
OF PNEUMATIC TIRES
Filed Aug. 24, 1950

INVENTOR.
JOSEPH F. REHEISER
BY James J. Long
Agent

Patented Sept. 1, 1953

2,650,642

UNITED STATES PATENT OFFICE 2,650,642

METHOD OF PREVENTING BLOWS IN MANUFACTURE OF PNEUMATIC TIRES

Joseph F. Reheiser, Eau Claire, Wis., assignor to United States Rubber Company, New York, N. Y., a corporation of New Jersey Application August 24, 1950, Serial No. 181,207

1 Claim. (Cl. 154—14)

This invention relates to a method of making pneumatic tires, and more particularly it relates to a method of providing for escape of air trapped between component parts of a pneumatic tire in process of assembly, to prevent blowing or separation of such component parts.

In conventional practice, pneumatic tires are made by superimposing a plurality of plies of skim-coated reinforcing fabric on a building drum to form a tire carcass assembly. The tread portion of the tire and associated side wall portions, usually formed as a single unit by extrusion, are then superimposed on the carcass assembly. The resulting raw tire band is shaped in toroidal form, usually with the aid of a vacuum shaping box, and then vulcanized under pressure in a mold. It sometimes happens that air becomes entrapped within the tire assembly as the component parts are being assembled, either between the various carcass plies or, more frequently, between the outer or top ply and the tread portion. An air pocket is thus formed within the tire assembly, preventing proper union or adhesion of the tire parts, and when the tire is subjected to vulcanizing temperature and pressure, such pocket spreads out over a relatively large area forming a serious defect known as a "blow." Tires containing such blows are of course worthless and must be discarded, and such tires therefore represent considerable wastage of material, time and labor. If the blow is not discovered and the tire is put into service, the tire is in danger of failing suddenly without warning.

Accordingly, it is a principal object of the present invention to provide a method of preventing entrapment of air pockets within a pneumatic tire assembly.

Figure 1:
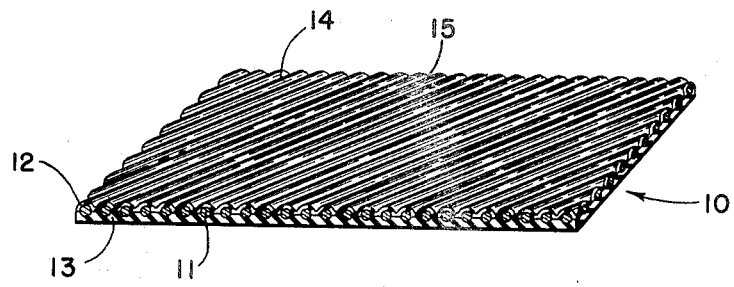
Figure 2:
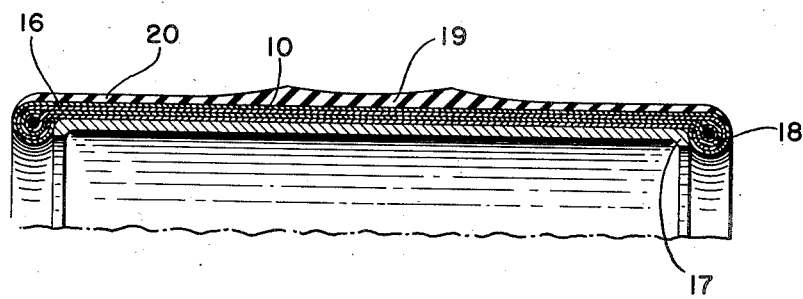
Figure 3:
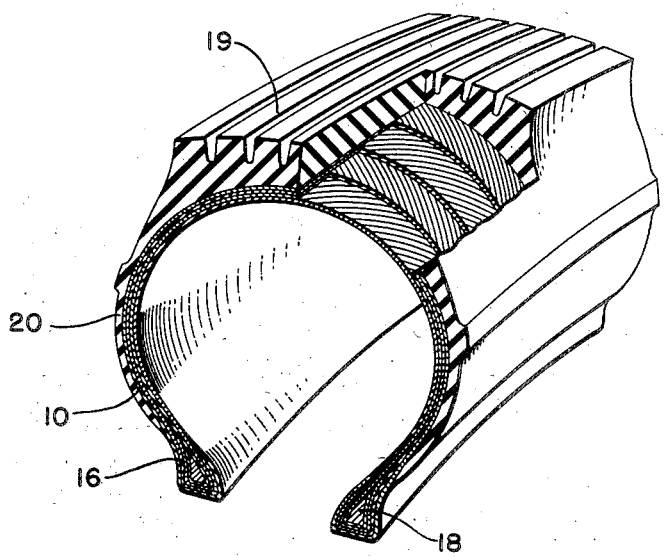

The invention will be described in detail with reference to the accompanying drawing, wherein Fig. 1 is a fragmentary perspective view of a skim coated reinforcing fabric for building a tire carcass in the manner of this invention;

Fig. 2 is a fragmentary cross sectional view of a raw tire containing such fabric assembled on a building drum; and Fig. 3 is a perspective view in transverse cross section of a portion of a completed tire, with parts broken away.

The method of this invention contemplates provision of means for escape of air from between the various component parts of the tire as the tire is being assembled so that no air pockets are trapped therebetween and blows are avoided. It has been found that if the skim-coated fabric comprising one or more of the reinforcing elements of the tire is provided on one surface with minute channels or passageways in the form of grooves or corrugations, any air included between the tire components as they are superimposed is permitted to escape and subsequent blows are eliminated.

Referring to Fig. 1, there is shown therein a length of skim coated tire fabric 10 of the character employed in the present invention. Such fabric is a cord fabric composed of a plurality of parallel reinforcing filaments or strands 11, most commonly textile materials such as rayon or cotton yarns or cords, although wire is also sometimes used for this purpose. The reinforcing strands, if made of textile material, are usually impregnated with a resin-latex mixture to improve the adhesion to rubber.

Skim coatings 12 and 13 of vulcanizable rubber carcass stock are calendered onto each side of the fabric. The upper skim coating 12 is made sufficiently thin with respect to the textile elements 11 so that such elements produce perceptible bulges 14 in the outer surface of the coating. Thus, there is formed a coating 12 having on its surface a series of parallel ridges 14 corresponding to the greatest diameter of the yarns or cords 11, and having interposed depressions or grooves 15, corresponding to the spaces intervening adjacent cords. The surface of the layer 12 thereby has imparted to it corrugations perceptible visually and by touch. With the usual reinforcing yarns or cords having a diameter within the range of from 0.02 to 0.033 inch, it is found that skim coatings of carcass stock within the range of from 0.0025 to 0.006 inch give the desired roughened effect; it being understood that the thinner coatings are employed with the smaller cords or yarns.

The skim coating 13 on the other side of the fabric is made relatively thick in order to provide the required amount of rubber stock in the tire carcass and in order to maintain the optimum thickness of rubber between superimposed carcass plies. The coating 13 is made from 0.008 to 0.02 inch thick depending on such variables as the size and type of the tire, and the number of plies in the carcass.

Referring to Fig. 2, the carcass 16 of the tire is built up of a plurality of separate layers or plies, in this case four plies, of the skim coated textile fabric 10 on the surface of the usual cylindrical tire building drum 17. The first layer of fabric 10 is applied to the drum 17 with the corrugated or ridged surface layer 12 (Fig. 1) facing upwardly, and the next ply is disposed on top of this, also with the corrugated surface layer 12 facing upwardly. The two plies are then pressed or stitched firmly together. Any air that has been included between the two plies in process of assembly is enabled to escape by reason of the fact that the ridged surface of the layer 12 presents continuous escape passageways or channels 15 (Fig. 1) extending across the fabric, along which the air passes out as the plies are pressed together. This process is continued until the desired number of plies, in this case four plies, have been assembled. It will be understood that the reinforcing fabric 10 is conventionally cut on a bias so that the reinforcing strands therein run at an angle from one side of the carcass to the other, alternate plies being disposed to run in opposite directions. The lateral edges of the carcass assembly are wrapped around inextensible bead assemblies 18 in the usual manner.

A vulcanizable rubber tread assembly 19 including side wall portions 20 is then applied in the form of a strip of suitable length to the carcass band 16 on the drum 17, and spliced and stitched to cause it to adhere firmly thereto. Again, the ridges on the upper surface layer 12 of the upper ply prevent air from becoming entrapped between the tread assembly and the carcass by permitting the escape of air as these parts are pressed together.

The raw tire assembly is removed from the building drum 17, and is shaped in toroidal form in the well known manner in a vacuum shaping box (not shown), wherein the usual curing bag (not shown) is inserted in the tire. The tire and curing bag are placed in the usual vulcanizing mold (not shown) wherein fluid pressure is applied to the interior of the curing bag to cause the tire to conform to the mold under pressure. Heat is applied to the tire internally and externally to vulcanize same, forming the completed tire as shown in Fig. 3.

It has been observed in actual practice of the invention that blows are not formed in the tires assembled by the improved method, and the resulting tires when extensively road tested, have shown the same strength, quality, and wearing characteristics as tires made in the conventional manner. Examination of the interior of the tire shows that the various plies and the tread portion become knitted together firmly during the vulcanization operation and no voids or traces of the corrugations on the surface of the skim coatings remain.

In some cases it is found sufficient to employ skim coated fabric reinforcing plies having a ridged upper surface only on the upper reinforcing element; that is, the reinforcing ply immediately below the tread assembly, since it is between the bottom of the tread assembly and the top of the carcass assembly that blows most commonly tend to develop. However, it is preferable that all of the plies in the tire be made in this manner. In this way, only one type of ply need be manufactured, and there are equal quantities of rubber provided between the two uppermost plies and the two lowermost plies. The extra heavy skim coating on the bottom side of the bottom ply gives the interior of the tire casing a desirable smooth surface.

Having thus described my invention what I claim and desire to protect by Letters Patent is:

A method of making a pneumatic tire comprising the steps of providing reinforcing plies by calendering a skim-coating of vulcanizable rubber stock onto both sides of a tire fabric composed of parallel textile reinforcing elements, said textile elements having a diameter within the range of from 0.02 to 0.033 inch, the skim-coating on one side of said fabric being from 0.0025 to 0.006 inch thick so that said textile elements produce perceptible ridges in the surface of said skim-coating, and the skim-coating on the other side of said fabric being from 0.008 to 0.02 inch, superimposing a plurality of such plies on a tire building drum with said ridged surfaces facing upwardly to form a tire carcass, incorporating inextensible beads in the carcass, superimposing a vulcanized rubber tread and sidewall thereon, and shaping and vulcanizing the assembly.

JOSEPH F. REHEISER.

References Cited in the file of this patent

UNITED STATES PATENTS

| Number | Name | Date |
|---|---|---|
| 790,907 | Marks | May 30, 1905 |
| 1,862,492 | Mallory | June 7, 1932 |
| 2,007,909 | State | July 9, 1935 |
| 2,015,459 | Musselman | Sept. 24, 1935 |
| 2,541,506 | Cuthbertson et al. | Feb. 13, 1951 |